Nov. 15, 1955  R. DEIBEL  2,723,413
WIPER BLADE
Filed Dec. 14, 1949
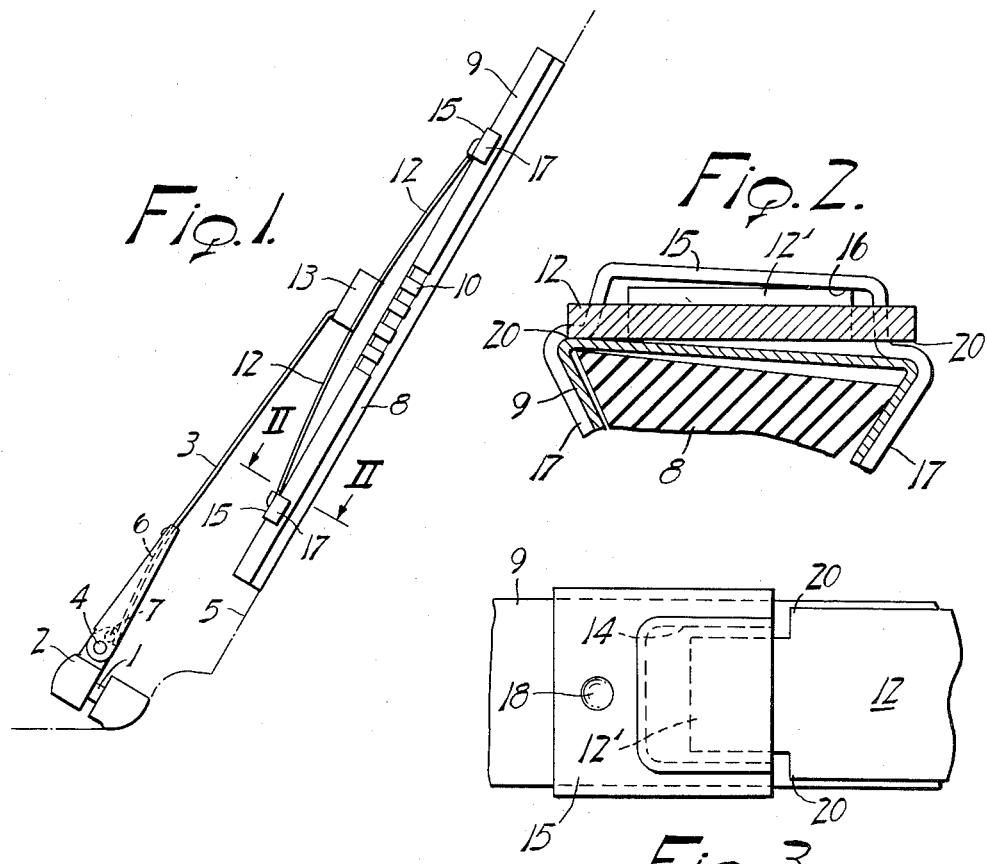
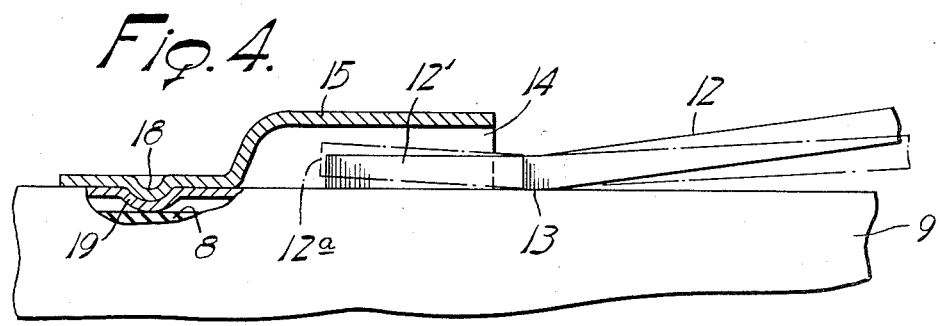
INVENTOR
Raymond Deibel
BY
Bean, Brooks, Buckley & Bean
ATTORNEYS

United States Patent Office 2,723,413
Patented Nov. 15, 1955

2,723,413

WIPER BLADE

Raymond Deibel, East Aurora, N. Y., assignor to Trico Products Corporation, Buffalo, N. Y.

Application December 14, 1949, Serial No. 132,906

8 Claims. (Cl. 15—245)

This invention relates to the windshield cleaning art and more particularly to the wiping blade which is oscillated back and forth on the windshield surface in order to maintain a clear field of vision therethrough. Supposedly flat windshields have surface irregularities which cause streaks to be left by a rigid, inflexible wiping blade. It has heretofore been proposed to provide a wiping blade with plural rigid sections, flexibly connected for wiping windshield surface portions not in true co-planar relationship, and an arm pressure distributing bracket or yoke arranged to apply the actuating arm pressure to the blade sections.

The present invention has for its primary object to provide a more efficient mounting for the semi-flexible or semi-rigid wiping blade by which the arm pressure is more effectively distributed to the wiping edge.

A further object of the invention is to provide an arrangement of this character in which the rocking action of the wiper on its bracket is controlled or regulated in accordance with the arm pressure.

The foregoing and other objects will manifest themselves as the following description progresses, reference being had to the accompanying drawing, wherein Fig. 1 is a side elevation showing a practical application of the invention;

Fig. 2 is a transverse sectional view through the wiping blade about on line 2—2 of Fig. 1;

Fig. 3 is a fragmentary plan view of one of the bracket attaching clips on the blade; and Fig. 4 is a fragmentary view partly in longitudinal section more clearly showing the bracket attaching clip in its mounted position.

Referring more particularly to the drawing, the numeral 1 designates the power shaft, 2 the inner or mounting section of the wiper oscillating arm, and 3 the outer or blade carrying section of the arm pivoted to the mounting section as at 4, the outer end of the arm being urged toward the windshield surface 5 by means of a spring leaf 6 bearing upon a support 7.

The wiper blade comprises a squeegee element 8 of rubber, or other suitable elastic material, and a channeled holder or backing 9 embracing its back edge, the side walls of the channel being interrupted as at 10 to form an intermediate hinge portion flexibly or pivotally uniting the rigid sections at the opposite ends of the wiping blade.

The spring urge of the wiper arm 2, 3 is distributed longitudinally along the wiping edge of the blade by means of a bowed pressure distributing bracket or yoke which has an intermediate arm attaching device 13 and two oppositely extending arms 12. The bracket is formed of flat spring stock and therefore the arms are generally resilient so that the spring urge imposed by the wiper arm will tend to flatten the generally bowed formation of the bracket. The back of the channeled backing 9 is substantially flat. Therefore, the outer ends of the flat spring arms bearing upon the flat back of the blade will exert a normalizing or erecting influence on the blade when at rest. The outer ends of the spring arms 12 terminate preferably in reduced tongues 12' which are deflected to lie substantially flat upon the back wall of the blade. When the spring arms 12 are placed under the urge of the actuating arm, the tongues will tilt and their free extremities will lift off from the back of the blade, as at 12a, by reason of the fulcruming action of the tongues upon the heel portions 13. The tongues are engaged in opposing pockets 14 of retaining clips 15, the engagement being sufficiently loose to permit the blade rocking about its wiping edge until arrested by the engagement of the tongues 12' with the overhanging pocket walls, as indicated at 16 in Fig. 2. The rigid backing sections are capable of independent rocking action on their respective heel portions 13, the latter forming in effect transverse ridges upon which the rigid back sections may rock about transverse axes by reason of the interrupted medial hinge section 10.

The retaining clips 15 are in the nature of small channel shaped members having their sides 17 slidably embracing the back of the blade. A small detent 18 pressed from the body of the retaining clip may engage in a recess 19 in the backing 9, as shown more clearly in Fig. 4, to hold each clip against sliding on the blade. Inwardly from this interlock 18, 19 the body wall of the retaining member is raised off the backing 9 to form the pocket 14 in which the tongues 12' rockably engage. The tongues are preferably reduced in width, as shown in Fig. 3. The rocking action of the wiper blade will therefore occur on the lateral shoulders 20. The retaining members may be stamped from sheet metal for ready shaping to provide the overhanging pocket-forming wall.

The blade is readily attached to the arm pressure distributing bracket 12 by simply inserting the tongues in the pockets 14, this being facilitated by longitudinally displacing one clip with respect to the other which displacement is permitted by the resiliency of the detent 18 and the underlying recess in the flexible backing. After the tongues are properly positioned the clips are again located at their proper points to reengage the detents in their recesses. Since it is only necessary to adjust one pocket with respect to the other, the latter may be shaped out of the backing itself to be integral therewith.

By reason of the transverse flat engagement of the ends of the spring arms upon the flat backing, the arm pressure will cause a normalizing tendency for erecting the wiping blade upon the windshield glass during periods of inactivity. The rocking of the blade is regulated automatically with variations in the arm pressure, the extent of rocking decreasing as the arm pressure increases to facilitate the turning of the blade upon its wiping edge at the start of each stroke. The invention is practical and economical in construction and assembly, and while the foregoing description has been given in detail it is without thought of limitation since the inventive principles involved are capable of assuming other physical embodiments without departing from the spirit of the invention and the scope of the appended claims.

What is claimed is:

1. A windshield wiping blade having an elastic squeegee element and a channeled backing embracing the same and having transversely substantially flat back face portions, spaced clips secured over the backing and having wall portions raised off the latter to form opposed inwardly facing pockets, and an arched pressure distributing bracket having mounting means intermediate its length and oppositely extending arms of flat spring formation each having its outer terminal deflected to provide a transversely extending heel portion and a longitudinally extending reduced tongue, the two heel portions rocking alternately upon the back face portions and the tongues being engaged within the pockets for playing up and down therein while limiting the rocking of the backing upon the heel portions about transverse axes.

2. A windshield wiping blade having an elastic squeegee element and a channeled backing rockably embracing the same, spaced clips secured over the backing for relative longitudinal movement and providing opposed inwardly facing pockets, means securing the clips against such relative movement, and an arm pressure distributing bracket having oppositely extending arms with their outer ends each having a transversely extending heel supporting the channeled backing for rocking about transverse axes, said outer ends terminating in reduced tongues engaging in the pockets for rocking about longitudinal axes.

3. A windshield wiping blade having a squeegee, a backing therefor having opposed end sections flexibly connected for individually following changes in surface contour of the windshield, a bowed pressure distributing bracket having mounting means intermediate its ends and oppositely extending arms terminating in transversely flat heel portions bearing upon transversely flat surface portions of the backing of the blade for lateral rocking and the end sections for independent rocking about transverse axes, said arms having rock-limiting shoulders spaced lengthwise from the heel portions, and retaining shoulders carried by the end sections and overlying the rock-limiting shoulders in spaced relation thereto for limiting such rocking movements.

4. A windshield wiping blade comprising an elongate flexible squeegee element with a backing therefor having rigid channeled end sections flexibly joined at their adjacent ends for surface conformance but connected together for rocking laterally as a unit, a pressure distributing elongate bracket adapted for mounting upon an actuating arm and having its opposite ends seating upon the backs of the respective rigid channeled sections for affording lateral rocking support therefor, the said bracket ends having transversely spaced marginal portions and the backs of the channeled sections having cooperating transversely spaced marginal portions underlying and alternately engageable with the first marginal portions to serve as fulcrum points of support during such lateral rocking, and opposing pockets on the backs of the channeled sections receiving and loosely confining the engaged ends to the backs of the channeled sections for such lateral rocking.

5. A windshield wiping blade comprising an elongate flexible squeegee element with a backing therefor having rigid channeled end sections flexibly joined at their adjacent ends for surface conformance but connected together for rocking laterally as a unit, a pressure distributing elongate bracket adapted for mounting upon an actuating arm and having its opposite ends seating upon the backs of the respective rigid channeled sections for affording lateral rocking support therefor, the said bracket ends having transversely spaced marginal portions and the backs of the channeled sections having cooperating transversely spaced marginal portions underlying and alternately engageable with the first marginal portions during such lateral rocking, the opposite ends of the bracket having reduced tongues extending beyond said marginal portions and having transversely spaced side margins and means on the backs of the channeled sections overhanging the tongues and alternately engageable by the side margins thereof to limit the lateral rocking of the channeled sections upon the wider spaced marginal portions.

6. A windshield wiper comprising a flexible blade body having a wiping edge and a broad back portion with side margins, a channeled backing therefore loosely embracing the back portion and having side marginal portions alternately engageable by the body margins during lateral rocking of the body within the channel, said backing having rigid end sections channeled in cross section, the adjacent ends of the rigid sections being flexibly joined by an intermediate section to permit relative surface-conforming movement between the rigid sections while holding them in alinement for lateral rocking as a unit, and an arm-pressure distributing bridge arched over the intermediate section and having its opposite ends formed with transversely spaced heel portions on which the rigid sections rockably engage in supporting the blade body for lateral rocking movement.

7. A windshield wiper comprising a flexible blade body having a wiping edge and a back portion with side margins, a channeled backing therefore loosely embracing the back portion, said backing having rigid end sections channeled in cross section and provided with transversely broad back faces, the adjacent ends of the rigid sections being flexibly joined by an intermediate section to permit relative surface-conforming movement between the rigid sections while holding them in alinement for lateral rocking as a unit, and an arm-pressure distributing bridge arched over the intermediate section and having its opposite ends terminating in longitudinally extending tongues rockably bearing upon the back faces and supporting the three backing sections for lateral rocking as a unit.

8. A windshield wiper comprising a flexible blade body having a wiping edge and a back portion with side margins, a channeled backing therefor loosely embracing the back portion, said backing having rigid end sections channeled in cross section and provided with transversely broad back faces, the adjacent ends of the rigid sections being flexibly joined by an intermediate section to permit relative surface-conforming movement between the rigid sections while holding them in alinement for lateral rocking as a unit, an arm-pressure distributing bridge arched over the intermediate section and having its opposite ends terminating in longitudinally extending tongues rockably bearing upon the back faces thereby supporting the three backing sections for lateral rocking as a unit, a retaining member mounted on the back of each rigid section and having a pocket receiving the adjacent tongue with sufficient clearance for permitting such rocking action, one of said retaining members being longitudinally slidable to effect such pocket engagement, and means for securing said one retaining member against longitudinal displacement.

References Cited in the file of this patent

UNITED STATES PATENTS

| | | |
|---|---|---|
| 1,920,730 | Wiseman | Aug. 1, 1933 |
| 1,953,635 | Rose | Apr. 3, 1934 |
| 2,128,454 | Cullin | Aug. 30, 1938 |
| 2,206,343 | Zaiger | July 2, 1940 |
| 2,274,277 | Rousseau | Feb. 24, 1942 |
| 2,303,694 | Horton | Dec. 1, 1942 |